April 7, 1970 M. P. YOUNG 3,505,564

AUTOMATIC TRIGGER CIRCUIT FOR PASSIVE CLAMP SYSTEM

Filed Nov. 29, 1967 4 Sheets-Sheet 1

INVENTOR
MARVIN P. YOUNG

BY D. A. Kettlestrings AGENT

R. Sciascia ATTORNEY

INVENTOR
MARVIN P. YOUNG

BY D.A. Kettlestrings AGENT
R. S. Sciascia ATTORNEY

AUTOMATIC TRIGGER CIRCUIT FOR PASSIVE CLAMP SYSTEM

Filed Nov. 29, 1967 4 Sheets-Sheet 3

INVENTOR
MARVIN P. YOUNG
BY D. A. Kettlestrings AGENT
[signature] ATTORNEY

AUTOMATIC TRIGGER CIRCUIT FOR PASSIVE CLAMP SYSTEM

Filed Nov. 29, 1967 4 Sheets-Sheet 4

INVENTOR
MARVIN P. YOUNG
BY D A Kettelstrings AGENT
R. Sciascia ATTORNEY

United States Patent Office
3,505,564
Patented Apr. 7, 1970

3,505,564

AUTOMATIC TRIGGER CIRCUIT FOR PASSIVE CLAMP SYSTEM

Marvin P. Young, Alexandria, Va., assignor to the United States of America as represented by the Secretary of the Navy Filed Nov. 29, 1967, Ser. No. 686,623
Int. Cl. H02h *7/16;* H03k *1/14, 1/18*
U.S. Cl. 317—12 6 Claims

ABSTRACT OF THE DISCLOSURE

An automatic trigger circuit for a passive clamp system adapted to be coupled across a high voltage LC circuit wherein the clamp system includes a clamp switch that shunts the capacitive component of the LC circuit and which is triggered at the time of the first current maximum within the LC circuit by the automatic trigger circuit. A trigger capacitor and a spark gap are coupled together so that the trigger capacitor discharges when the current reaches its first maximum in the LC circuit, and the discharge of the trigger capacitor triggers the clamp switch so that the current in the LC circuit is clamped.

The invention described herein may be manufactured and used by or for the Government of the United States of America for governmental purposes without the payment of any royalties thereon or therefor.

BACKGROUND OF THE INVENTION

The present invention relates to an automatic trigger circuit for a passive clamp system and more particularly to such a clamp system which is adapted to be used with high voltage LC circuits wherein the trigger circuit activates the clamp system so that it clamps at the time of the first current maximum within the LC circuit and at the time when the voltage within the LC circuit is zero. The delay time of this clamp system generator is not a function of the ringing frequency of the LC circuit and thus does not have to be readjusted when the energy of the LC circuit is changed. No input trigger cables are required for this self-contained trigger circuit and thus the difficult problem of voltage isolation of cable grounds is eliminated. In addition, the simplicity of this trigger circut makes complete redundancy practical and economical.

In large plasma physics experiments it has been the practice to study the production, heating and containment of plasmas by fast-rising magnetic fields, as described in Patent No. 3,089,831 entitled "Method of Producing High Gas Temperature." As a result, the generation of pulsed high magnetic fields has been necessary and the currents used to generate these magnetic fields must also be characterized by a high initial *di/dt* so as to give rapid acceleration to the plasma. This high initial *di/dt* requirement has dictated parameters for the energy-storage-discharge circuit, which creates the high magnetic field, that have resulted in the generation of an oscillating current in the load coil. As a result, the lifetime of the effective magnetic field for containment of the plasma is limited to a portion of the first half-cycle of the oscillating current within the energy-discharge circuit.

One of the most critical problems confronting designers of such energy-discharge circuits has been to increase the durations of the magnetic fields used for compression and containment of the plasma. The effective durations of these fields have been limited to a portion of the first half cycle of the oscillating current. Accordingly, the need has long existed for longer lifetimes for the magnetic field which would result in longer compression times to facilitate plasma stability studies.

Among the various circuits which have been devised in an attempt to overcome this disadvantage has been the use of a plurality of capacitor banks which are coupled in parallel to a load coil wherein the banks have been sequentially fired in order to avoid ringing and to result in the aperiodic current waveform which is required to generate a longer lasting magnetic field. Such systems are referred to as power clamp or power crowbar systems. Although such systems have served the purpose, they are difficult to design and have not proved entirely satisfactory under all conditions of service. A major disadvantage of power crowbar systems is that the initial *di/dt* generated thereby has not been high enough to give the rapid acceleration to the plasma that is required.

Still another system which has been used to provide an aperiodic current waveform within the energy-discharge circuit is one in which a passive clamp circuit is introduced in the energy-discharge circuit at the time of the first current maximum to clamp the energy-discharge circuit wherein the delay time of the clamp switch trigger pulse is determined by the ringing frequency of the energy-discharge circuit, which in turn, depends on the value of the inductance and capacitance within the energy-discharge circuit. Thus a pulse of predetermined and calculated delay must be generated.

In addition, the use of separate clamp trigger circuits to generate delayed clamp trigger pulses, has not been entirely satisfactory under all conditions of operation for the reasons that the amount of delay required depends upon the ringing frequency of the energy-discharge circuit so that a change in the energy of the discharge circuit requires a change in the delay time of the clamp trigger pulse. Such prior art clamp triggering systems have also been relatively complex systems with a large number of components susceptible to failure; and because the prior art clamping systems have not been characterized by redundancy, a failure in any part of these prior art clamping systems has resulted in the complete failure of the clamping system as a whole with the resultant undesirable and often catastrophic oscillations occurring within the energy-discharge circuit. Also, where Marx circuits have been used as the energy-discharge circuit, the use of prior art trigger circuits for clamping the individual stages of the Marx circuit has required high voltage isolation of the associated input trigger cables.

SUMMARY OF THE INVENTION

The general purpose of this invention is to provide an automatic trigger circuit for a passive clamp system which will enable its associated energy-discharge circuit to achieve an aperiodic current waveform and to maintain the high initial *di/dt* that is required to give rapid acceleration to the plasma under study. To attain this, the present invention contemplates a unique arrangement wherein the energy-discharge circuit is automatically clamped at the time of the first current maximum and at the same time that the voltage within the energy-discharge circuit is zero. The subsequent coil current will then decay exponentially with a time constant equal to the ratio of the inductance to the resistance of the clamped energy-discharge circuit, thus providing a high magnetic field of far longer life than has heretofor been possible by the use of prior art systems.

An object of the present invention is the provision of an automatic trigger circuit for a passive clamp system adapted to be utilized with an energy-discharge circuit wherein an aperiodic current waveform with a high initial *di/dt* is achieved within the energy-discharge circuit when it is activated.

Another object is to provide an automatic trigger circuit for a clamp circuit adapted to be utilized with an energy-discharge circuit and adapted to prevent ringing within the energy-discharge circuit which, in turn, will allow the use of a higher working voltage for the capacitors in the energy-storage-discharge circuit and which will allow a greater amount of energy to be stored in the energy-storage discharge circuit.

A further object of the invention is the provision of an automatic trigger circuit for a passive clamp system to be utilized with a high voltage energy-discharge circuit that is used to create magnetic fields for the compression of plasma.

Still another object is to provide such a trigger circuit for a clamp system which prevents ringing in the associated energy-discharge circuit, which ringing can have catastrophic effects on the energy-discharge circuit.

Other objects accomplished by this invention include the provision of an automatic trigger circuit for triggering a passive clamp system wherein the delay time for generation of the clamp trigger pulse with respect to the activation of the energy-discharge circuit need not be predetermined in relationship to the ringing frequency of the energy-discharge circuit.

Other purposes of this invention are to provide such an automatic triggering circuit which is extremely simple in construction, which is redundant in operation and use so as to preclude the possibility of a catastophic failure of the entire clamp system; and which in use with a Marx circuit precludes the necessity for high voltage isolation of input cables associated with the triggering circuit.

Additional objects and features of the invention will become apparent to those skilled in the art as the disclosure is made in the following description of a preferred embodiment of the invention as illustrated in the accompanying sheets of drawings.

DESCRIPTION OF THE PREFERRED EMBODIMENT

Figure 1:
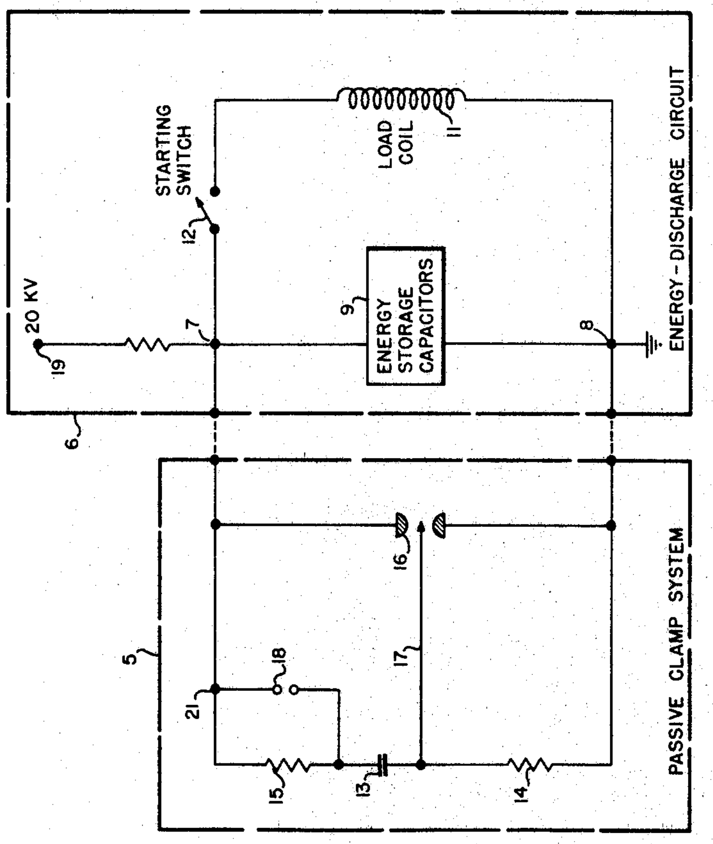
FIG. 1 shows a schematic view of a preferred embodiment of the invention as it is utilized with a high voltage energy-discharge circuit.

Referring now to the drawings there is shown in FIG. 1 a preferred embodiment of the automatic trigger circuit of this invention. A clamp system 5 is shown coupled across energy-discharge circuit 6 at terminals 7 and 8. The energy-discharge circuit 6 is represented as including energy storage capacitors 9 and a load coil 11. Typically, for conducting plasma studies a two-megajoule capacitor bank operating at 20 kv. could be used as the energy storage capacitors 9. In addition, this capacitor bank can be oriented within the energy-discharge circuit 6 so as to discharge in parallel into load coil 11, which may typically be a single turn coil on the order of 180 cm. long with a 10 cm. bore within which is located the plasma containment tube (not shown) in which the plasma is generated.

Although the capacitor bank has been described as one wherein the capacitors are connected in parallel across the load coil 11, and although only one clamp system 5 is shown coupled across this capacitor bank 9, it should be understood that other configurations are contemplated. For example, the capacitor bank may be comprised of a large number of capacitor modules wherein each module consists of a small number of capacitors. In this configuration each of these modules could have a separate and trigger system coupled in parallel therewith. In this way the malfunctioning of one clamp system would not discharge the entire capacitor bank but would only discharge the few capacitors located within the capacitor module associated with the malfunctioning clamp system. In addition to the parallel capacitor configuration described it should also be understood that the clamp system of this invention may be otherwise coupled with the energy storage capacitors coupled in series (such as in the Marx Circuit); or the clamp system may be coupled across several capacitor banks connected in series, wherein each bank consists of a plurality of parallel capacitors. However, for the purpose of explanation it will be assumed that the energy storage capacitors 9 of FIG. 1 represent a series of parallel capacitors operating at approximately 20 kv. It should also be understood that the value of 20 kv. is used merely for explanation and does not in any way limit the scope of this invention.

Figure 2:
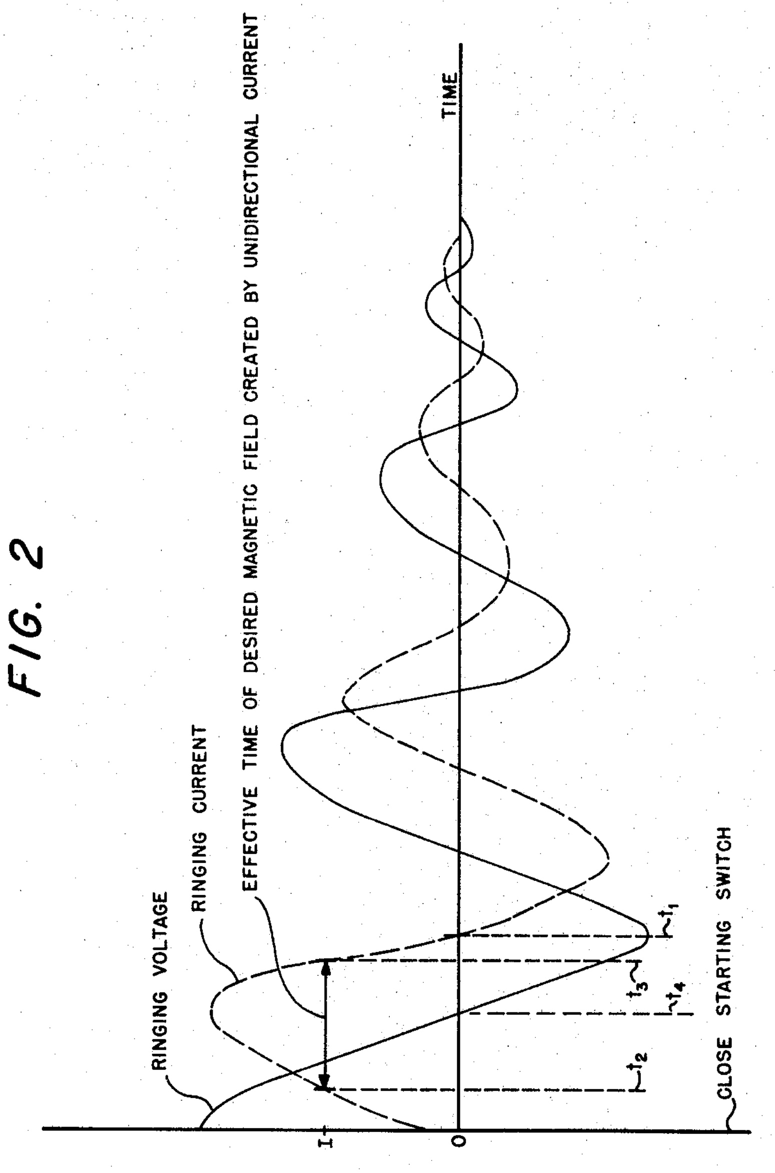
FIG. 2 illustrates the ringing voltage and ringing current which would occur within the energy-discharge circuit of FIG. 1 without the use of the passive clamp system.

Referring now to FIG. 2 there is shown waveforms representative of the voltage and current which are present in the energy-discharge circuit 6 after the starting switch 12 has been closed and wherein the passive clamp system 5, including the trigger circuit of this invention, has not been coupled across the energy-discharge circuit 6. When the starting switch 12 is closed the voltage stored in the energy storage capacitors 9 immediately begins to drop at the same time that the current begins to rise. The voltage will drop to zero while the current reaches its maximum, and then the voltage will begin to increase in the opposite direction to a maximum value while the current decreases to zero. At this point $t_1$ the voltage will begin to decrease in amplitude while the current will increase from zero in the opposite direction from which it originally flowed. This phenomenon is commonly known as ringing. It can be seen from a study of FIG. 2 that if a magnetic field is required to be produced from a unidirectional current having an amplitude greater than a predetermined value, the duration of this magnetic field will be limited to a time span represented between $t_2$ and $t_3$ if the predetermined amplitude of the unidirectional current must be greater than the value I.

In addition, this ringing within the energy-discharge circuit 6 limits the maximum permissable voltage rating for the capacitors 9, and ringing can result in catastrophic failures within the energy-discharge circuit 6, e.g. damage or destruction of the starting switch 12, damage or destruction of the storage capacitors 9 or breaking of the plasma containment tube (not shown) which would be located axially within the load coil 11.

By utilizing a passive clamp system 5, which incorporates the trigger circuit of this invention as shown in FIG. 1, in conjunction with an energy-discharge circuit, e.g. circuit 6, the undesirable ringing is eliminated and at the same time the duration of the magnetic field created by unidirectional current flow within the energy-discharge circuit 6 is greatly increased, and an aperiodic current waveform with a high initial $di/dt$ is achieved within the energy-discharge circuit 6.

In addition, the trigger circuit of this invention provides for the automatic triggering of clamp switch 16 whenever the current within the energy-discharge circuit 6 reaches its initial maximum value. This is accomplished without the necessity of first determining the ringing frequency of the energy-discharge circuit 6, as was required by the use of prior art clamping circuits in order to determine at what point in time after activation of the energy-discharge circuit 6 the initial current maximum therein would occur. The trigger circuit also is of simple construction and because a great many of these self-contained circuits can be used with an equal number of associated clamp switches 16 to clamp an equal number of capacitor modules, this redundancy precludes the possibility of a catastrophic failure of all the clamp switches and of the entire capacitor bank, which would result in the undersirable ringing of the entire energy-discharge circuit 6.

The passive clamp system 5 includes the automatic trigger circuit of this invention which has a trigger capacitor 13 in series relationship with a discharge resistor 14 and a charging resistor 15. These three elements, in turn, are coupled across terminals 7 and 8 of the energy-discharge circuit 6 as is clamp switch 16. One end of trigger lead 17 of clamp switch 16 is connected between storage capacitor 13 and discharge resistor 14 while the other end of lead 17 is connected to the trigger pin (not shown) located within the clamp switch 16. In addition, a spark gap 18 is coupled across charging resistor 15.

Figures 4A, 4B:
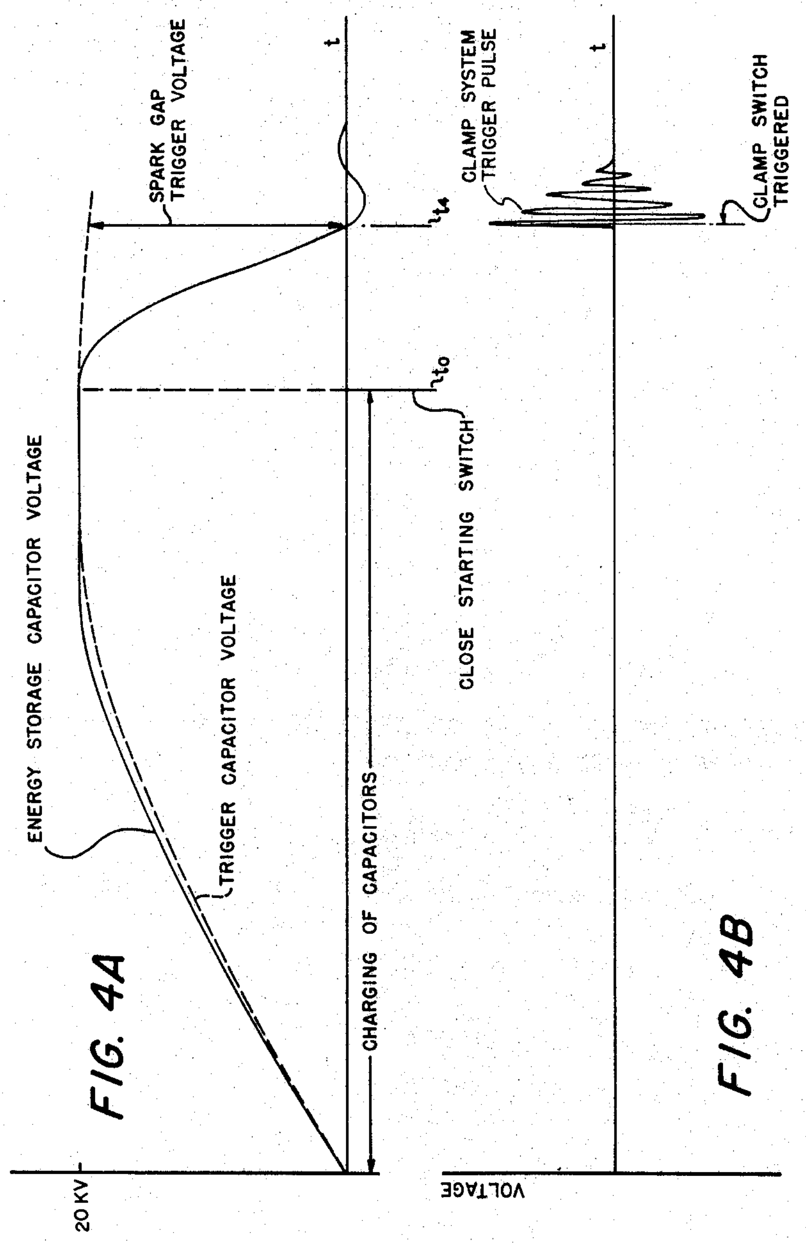
FIGS. 4A and 4B show the voltage and time relationship of the automatic trigger circuit to the LC discharge circuit.

In the operation of energy-discharge circuit 6 in conjunction with passive clamp system 5 and the automatic trigger circuit of this invention, the energy storage capacitors 9 and trigger capacitor 13 are initially charged up to 20 kv. as shown in FIG. 4A by the 20 kv. voltage located at terminal 19 of FIG. 1. The starting switch 12 is then closed and the 20 kv. voltage across energy storage capacitors 9 drops to zero while the current flow through load coil 11 increases to a maximum value. After the energy storage capacitors 9 have discharged and when the voltage across load coil 11 has reached zero, the voltage at terminal 7 and at terminal 21 is also zero. However, because the charging resistor 15 is of a very high resistance the 20 kv. charge on trigger capacitor 13, created when energy storage capacitors 9 were charged to 20 kv. decays very slowly, as shown in FIG. 4A, even though terminal 21 is at zero volt. The values of the charging resistor 15 and of the trigger capacitor 13 are very important and the time constant of these circuit elements must be very long compared to the initial quarter cycle of the ringing period of the energy-discharge circuit 6, as represented by $t_4$ in FIG. 2 and by time $t_0$–$t_4$ in FIG. 4A.

Figure 3:
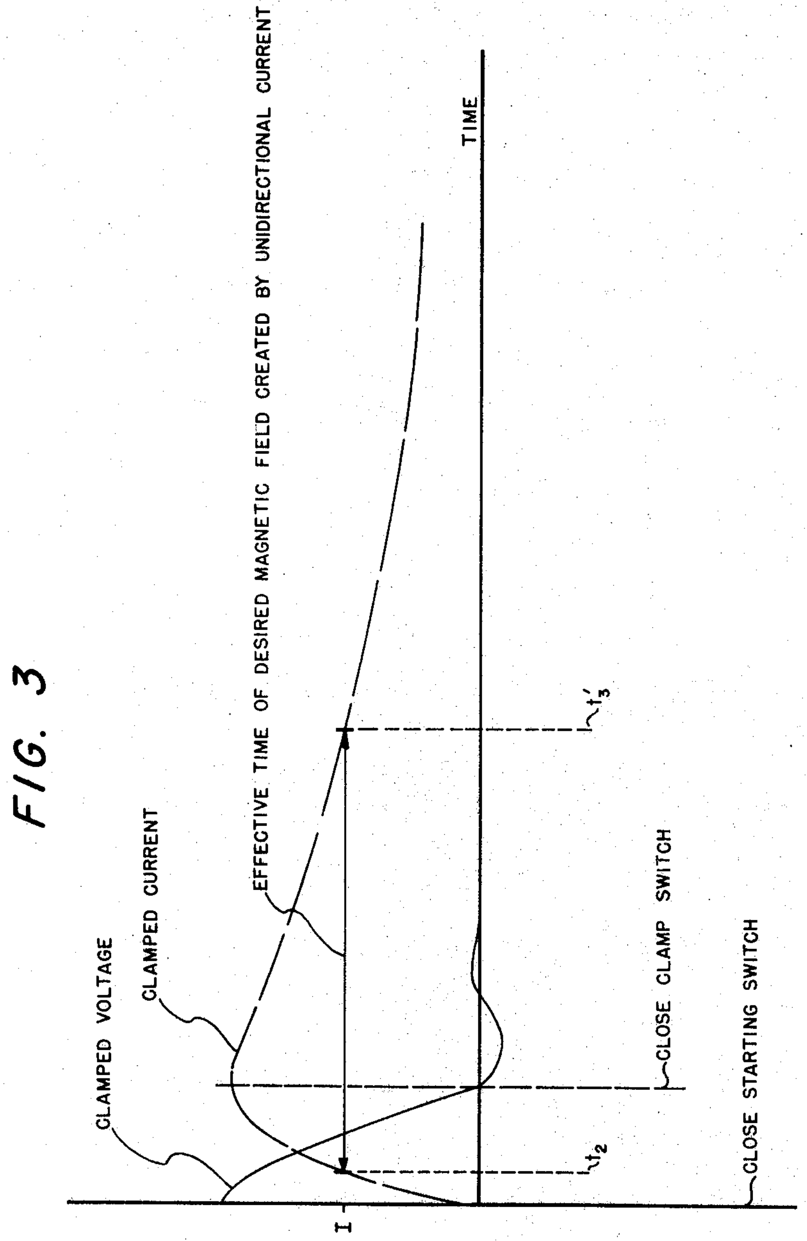
FIG. 3 shows the clamped voltage and clamped current which are present within the energy-discharge circuit of FIG. 1 when the passive clamp system is utilized in conjunction therewith.

The spark gap 18, in this example is set to discharge at approximately 20 kv. so that when the voltage at terminal 21 and across the energy storage capacitors 9 reaches zero, as shown in FIG. 4A, a spark will occur across gap 18 and trigger capacitor 13 will be discharged. This discharge of trigger capacitor 13, in turn, creates a voltage across discharge resistor 14, as shown in FIG. 4B, which is of sufficient magnitude to trigger clamp switch 16 closed by means of trigger lead 17. This closing of clamp switch 16 shunts the energy storage capacitors 9 which effectively eliminates any oscillations between load coil 11 and energy storage capacitors 9. As a result, the current through load coil 11, rather than ringing, decays at a rate determined by the resistance and inductance present in the energy-discharge circuit 6, as shown in FIG. 3; and the effective time $t_2$–$t_3$ of the desired magnetic field which is created by the unidirectional current having a value greater than I, is greatly increased as compared to that achieved without the clamp system and its automatic trigger circuit.

The passive clamp system and the automatic trigger circuit herein described provide a highly effective means for automatically achieving an aperiodic current waveform while maintaining a high initial $di/dt$ wherein these characteristics are utilized to give rapid acceleration to plasma which is under study. Although the automatic clamp system has been described in relationship with a specific energy-discharge circuit 6, it should be understood that this clamp system can be used effectively with other high voltage capacitive circuits.

What is claimed and desired to be secured by Letters Patent of the United States is:

1. An automatically triggered passive clamp system adapted to be coupled across energy storage capacitors of an energy-discharge circuit, comprising:

means for shunting said capacitors upon the occurrence of predetermined conditions within said energy-discharge circuit; and a trigger circuit including storage means associated with said shunting means for triggering said shunting means so as to bypass said capacitors upon the occurrence of said predetermined conditions within said energy-discharge circuit and means associated with said storage means and with a first end of said shunting means for initiating the discharge of said storage means upon the occurrence of said predetermined conditions within said energy-discharge circuit wherein said discharge triggers said shunting means so as to bypass said capacitors and at least one charging impedance associated with said storage means and with said first end of said shunting means wherein the time constant of said charging impedance and said storage means together is long compared to the first quarter cycle of the first ringing period of said energy-discharge circuit.

2. The clamp system of claim 1 wherein said trigger circuit further includes:

at least one discharge impedance associated with said storage means and with a second end of said shunting means.

3. The clamp system of claim 2 wherein said shunting means includes:

a trigger lead coupled between said storage means and said discharge impedance.

4. An automatically triggered passive clamp system adapted to be placed in circuit relationship with energy storage capacitors of an energy-discharge circuit, comprising:

a clamp switch;

a capacitor for triggering said clamp switch;

a trigger lead coupled between said capacitor and said clamp switch whereby said trigger lead enables the triggering of said clamp switch upon the discharge of said capacitor;

a spark gap coupled between said capacitor and said clamp switch for initiating the discharge of said capacitor upon the occurrence of predetermined conditions within said energy-discharge circuit; and a charging resistor coupled across said spark gap.

5. The clamp system of claim 4 wherein the time constant of said charging resistor and said capacitor is long compared to the first quarter cycle of the first ringing period of said energy-discharge circuit.

6. The clamp system of claim 4 further including:

a discharge resistor coupled between said capacitor and said clamp switch.

References Cited

UNITED STATES PATENTS

| | | |
|---|---|---|
| 2,307,598 | 1/1943 | Marbury. |
| 2,401,009 | 5/1946 | Marbury. |
| 2,546,008 | 3/1951 | Marbury et al. |
| 2,569,133 | 9/1951 | Podolsky. |

LEE T. HIX, Primary Examiner

W. M. SHOOP, Jr., Assistant Examiner

U.S. Cl. X.R.

307—93, 108, 267